Jan. 24, 1956  C. S. PRENDERGAST  2,731,919
PUMP OR MOTOR

Filed June 4, 1952  7 Sheets-Sheet 1

Inventor
CHARLES SCOTT PRENDERGAST

By John B. Brady
Attorney

Jan. 24, 1956  C. S. PRENDERGAST  2,731,919
PUMP OR MOTOR

Filed June 4, 1952                                                                 7 Sheets-Sheet 2

Inventor
CHARLES SCOTT PRENDERGAST

By John B. Brady
Attorney

Jan. 24, 1956    C. S. PRENDERGAST    2,731,919
PUMP OR MOTOR
Filed June 4, 1952    7 Sheets-Sheet 3
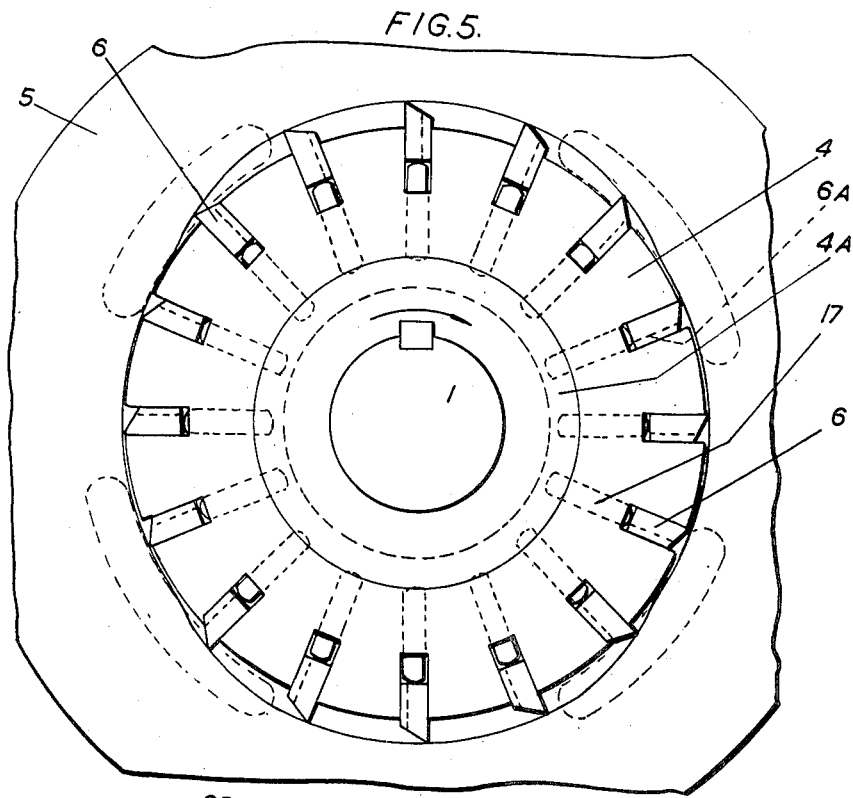
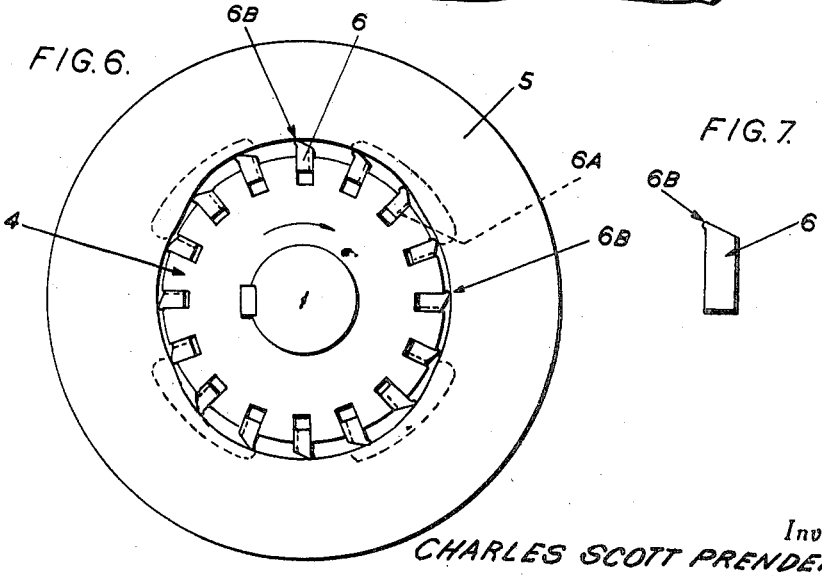
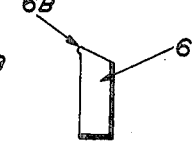
Inventor
CHARLES SCOTT PRENDERGAST
By
Attorney

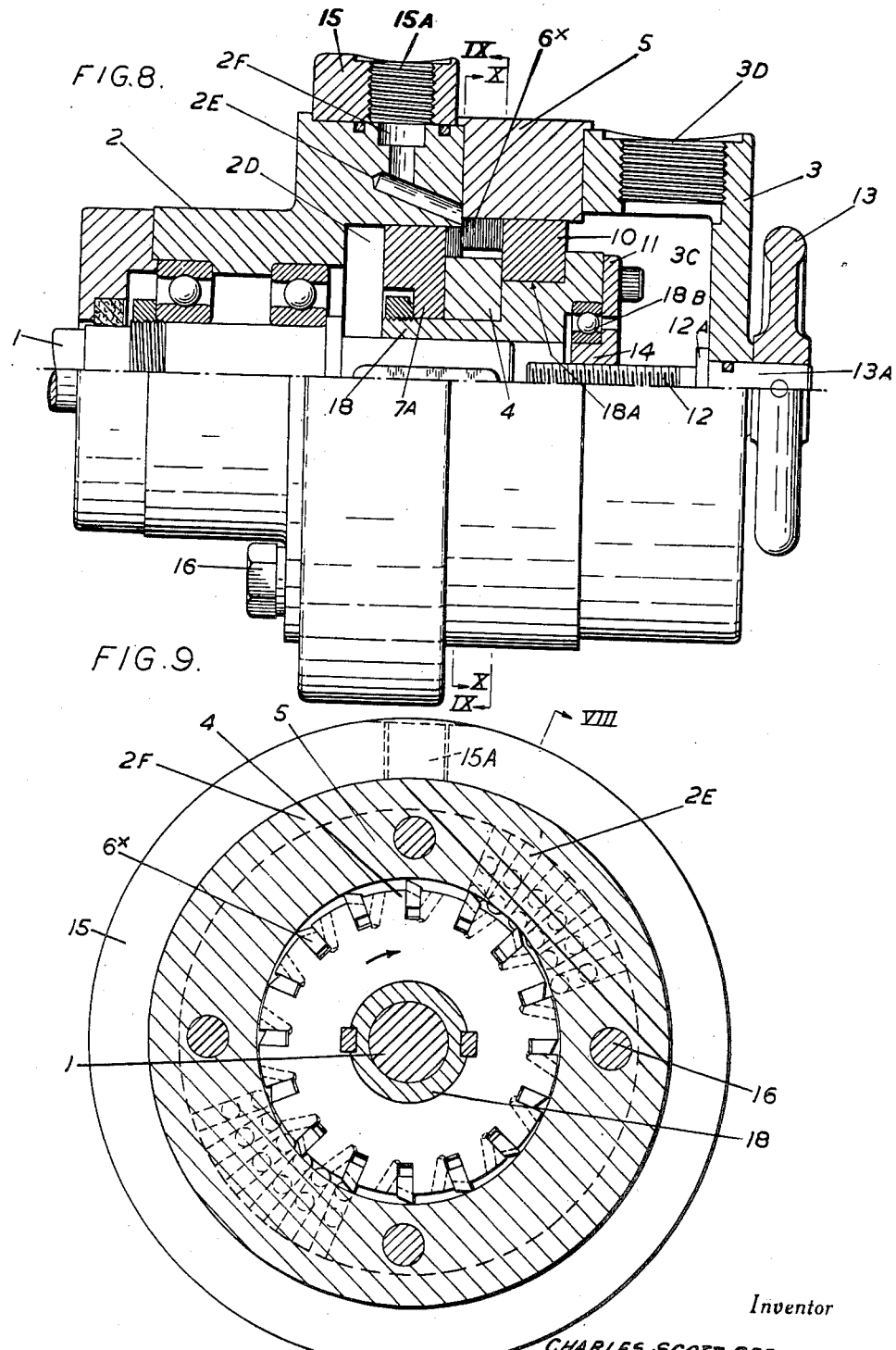

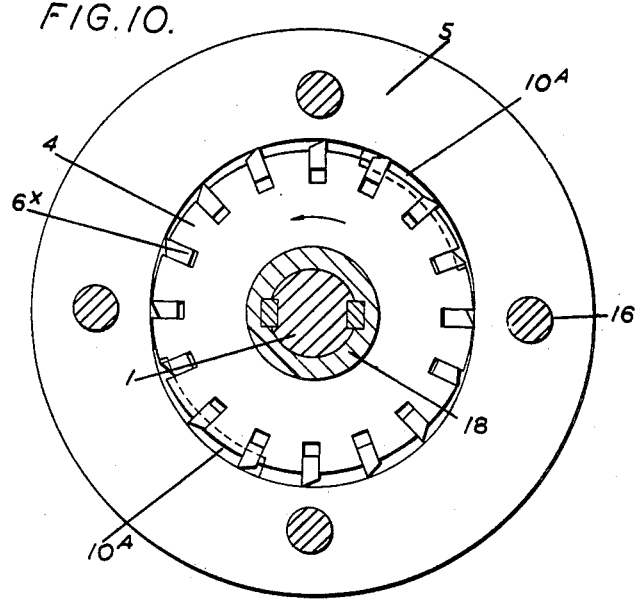
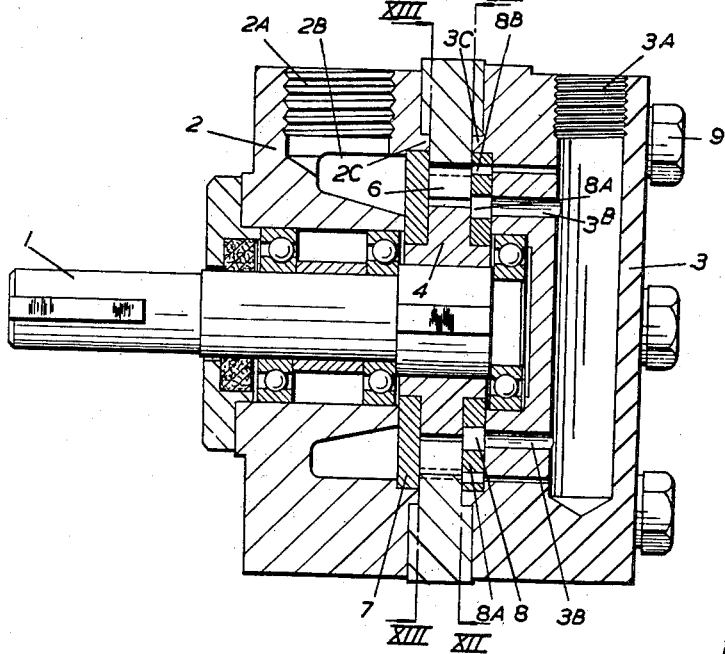

Jan. 24, 1956
C. S. PRENDERGAST
2,731,919
PUMP OR MOTOR
Filed June 4, 1952
7 Sheets-Sheet 6
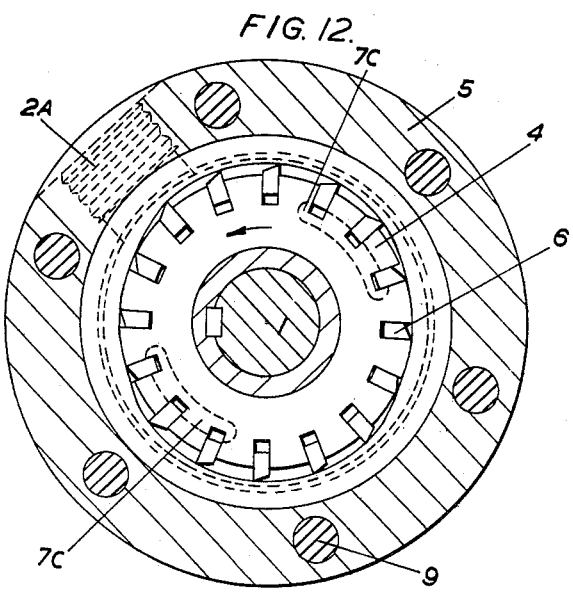
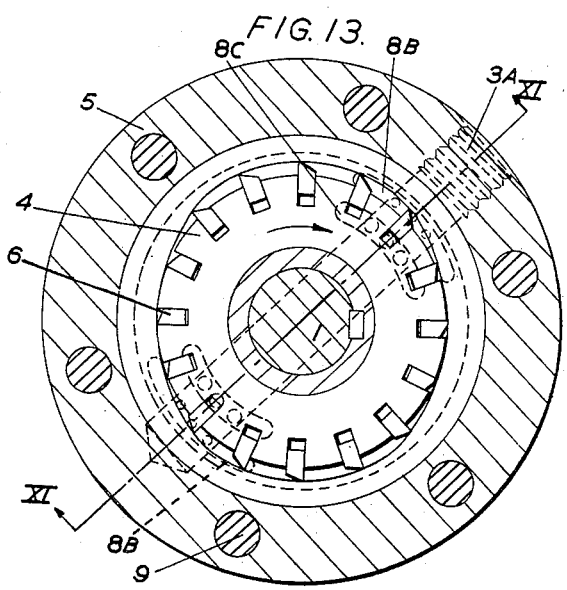
Inventor
CHARLES SCOTT PRENDERGAST
By John B. Brady
Attorney

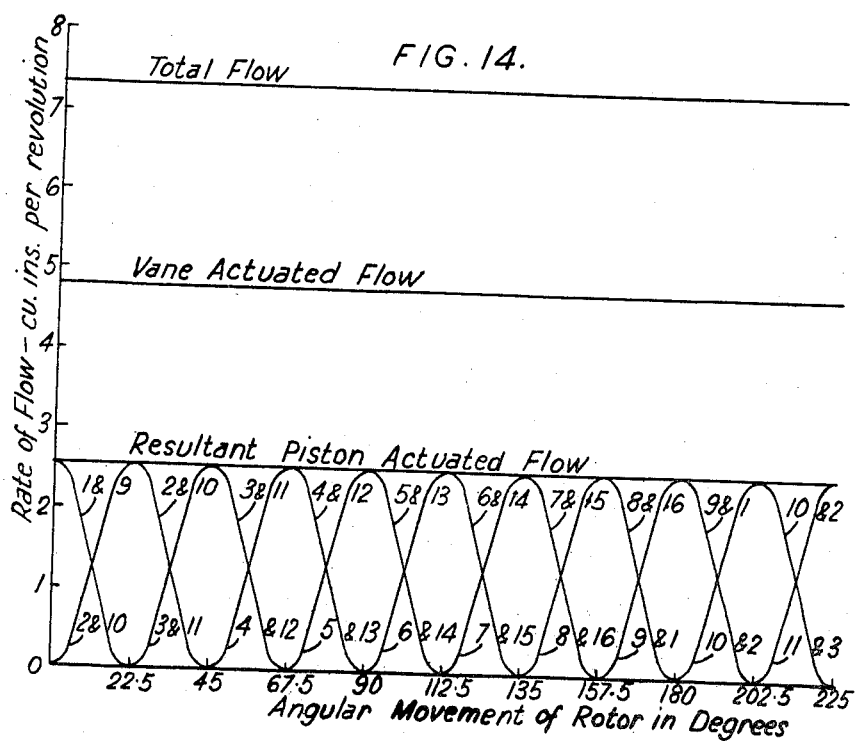

United States Patent Office 2,731,919
Patented Jan. 24, 1956

2,731,919
PUMP OR MOTOR

Charles Scott Prendergast, Eashing, England, assignor of one-half to Hamilton Gordon, Weyburn, England Application June 4, 1952, Serial No. 291,594

2 Claims. (Cl. 103—120)

This invention relates to rotary pumps and motors.

The invention provides an improved rotary pump or motor of the kind comprising a rotor rotatable within a surrounding stator and an even number of vanes radially slidable in equidistant recesses formed in the rotor, the space between the rotor and the stator bore in front of each vane in the order of rotation of the rotor being freely connected to the space at the bottom of the pertaining recess, the end of each vane in contact with the stator affording one fixed line of contact with the stator at or near the rear edge of the vane in the order of rotation of the rotor which line does not vary in relation to the rest of the vane as the rotor rotates, the stator bore being formed of two equal diametrically disposed arcs of major radius, two equal arcs of minor radius whose chords are at 90° to those of the arcs of major radius, and four equal joining curves each joining adjacent major and minor arcs, characterised in that each joining curve has an angular length double the angular distance between adjacent vanes and formed with radii that respectively decrease and increase in length from the major and minor arcs according to the square of their angular distance therefrom to a midpoint of radius which is the mean of the radii of the major and minor arcs.

A pump or motor in accordance with the invention may be constructed in the manner that each vane operates as such and as a piston thereby to afford a series of combined vane and piston displacements. Alternatively it may be constructed in the manner that each vane operates only as a piston.

By way of example some embodiments of the invention are illustrated on the accompanying drawings.

Fig. 5 represents a cross-section of a form of the pump in which means are provided to ensure continuous contact between the vanes and the stator bore.

Fig. 6 represents a cross-section of another form of the pump in which the rotor is substantially smaller than the minimum diameter of the stator bore.

Fig. 7 shows, on a larger scale, one of the vanes employed in the pump of Fig. 6.

Fig. 8 represents a longitudinal section through a variable deilvery pump in the plane VIII—VIII of Fig. 9.

Fig. 9 represents a cross-section in the plane IX—IX of Fig. 8.

Fig. 10 represents a cross-section in the plane X—X of Fig. 8.

Fig. 11 represents a longitudinal section in the plane XI—XI of Fig. 13 through a fixed delivery pump arranged for piston displacement only.

Fig. 12 represents a cross-section in the plane XII—XII of Fig. 11.

Fig. 13 represents a cross-section in the plane XIII—XIII of Fig. 11.

Fig. 14 is a flow diagram showing the series of displacements in a pump having an even number (sixteen) of vanes which act as such and as pistons.

Figure 1:
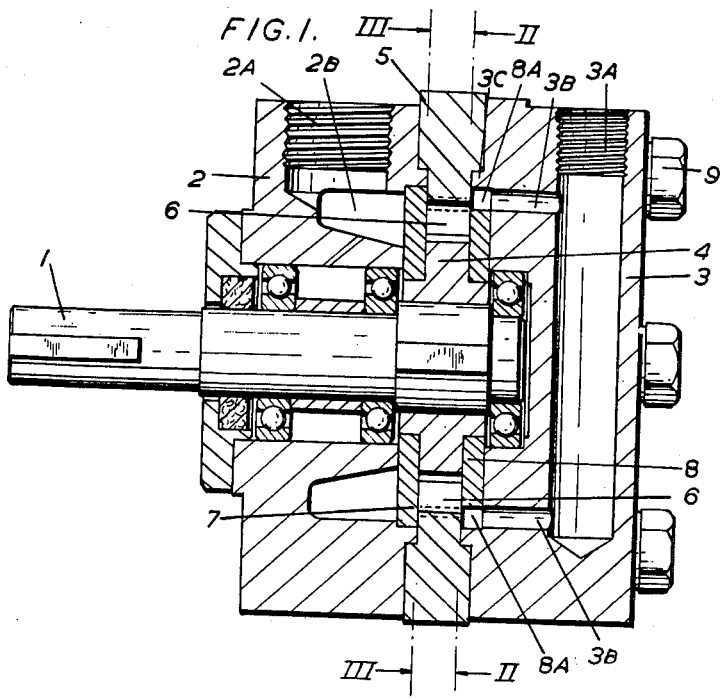
Fig. 1 represents a longitudinal section through a fixed delivery pump in the plane I—I of Fig. 3.
Figure 2:
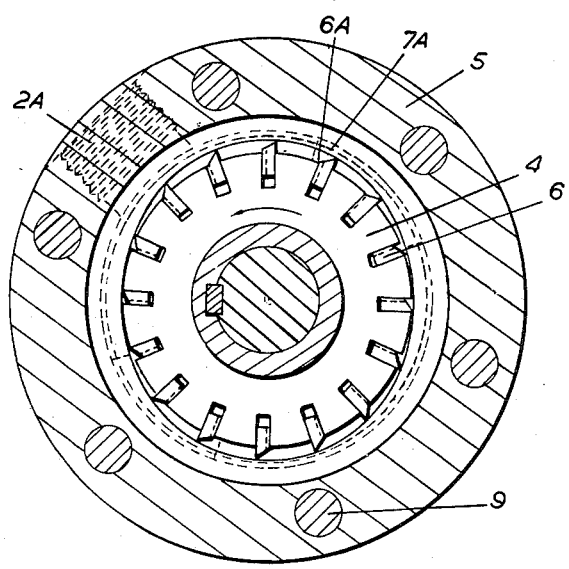
Fig. 2 represents a cross-section in the plane II—II of Fig. 1.
Figure 3:
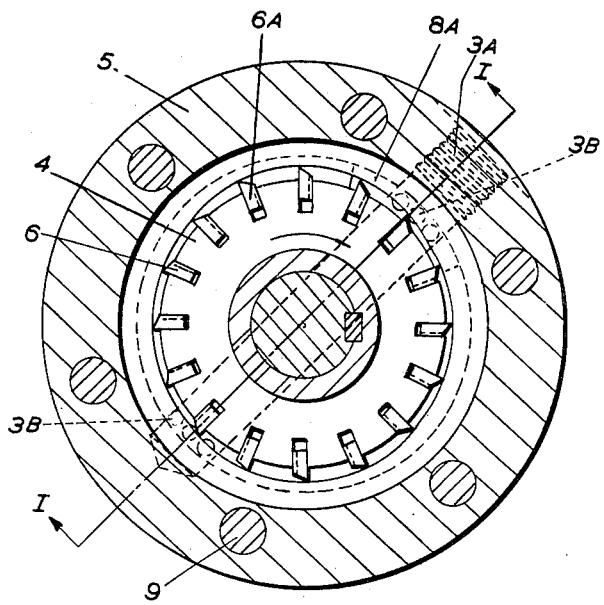
Fig. 3 represents a cross-section in the plane III—III of Fig. 1.
Figure 4:
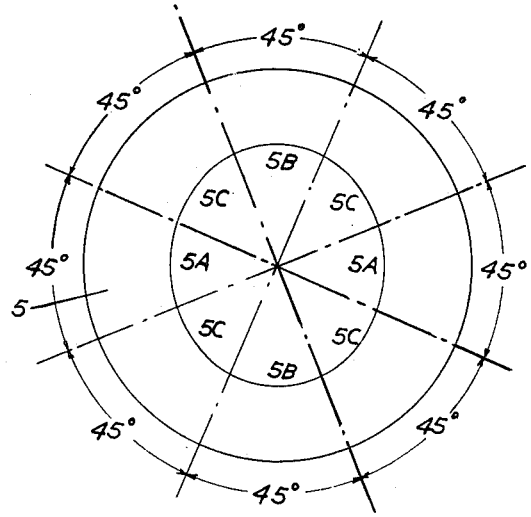
Fig. 4 is an end view of the stator showing the bore profile.

Referring first to Figs. 1 to 4, a shaft 1, journalled in end-housing members 2, 3 has keyed thereon a rotor 4 which is surrounded by a stator 5. The rotor is circular in form and is provided around its outer periphery with an even number (sixteen) of equidistant radial slots in each of which a vane 6 is free to slide. These vanes 6 maintain contact with the stator bore by reason of centrifugal force when the rotor 4 is rotating. Each vane is profiled at the end which co-acts with the stator bore (Figs. 2 and 3) so that line contact is maintained between it and the stator bore at the rear edge of the vane relative to the direction of rotation. Each vane has a channel 6A on its leading face in the direction of rotation of the rotor, which channel connects the space at the bottom of the slot in which the said vane slides with the space at the periphery of the rotor between the said vane and the next preceding vane.

The end-housings 2 and 3 (Fig. 1) have facings 7 and 8, preferably of anti-friction material, which enclose axially the partly annular spaces between the rotor periphery and the stator bore, and also the spaces in the radial slots wherein slide the vanes 6. The end-housings are spigoted at 2C and 3C to the stator 5, on either side of it, and the three members are secured rigidly together by bolts 9. The stator 5 is centrally disposed in relation to the rotor 4, and its shaft 1 but is sufficiently wider axially than the rotor to allow running clearance.

The stator bore is profiled as follows: Over two diametrically opposed portions 5A (Fig. 4), each of which is subtended by an angle of 45°, the bore presents circular arcs of a radius slightly greater than the radius of the rotor. Over two other diametrically opposed portions 5B, each of which is also subtended by an angle of 45°, the bore presents circular arcs of radius greater than those of the first mentioned arcs by an amount predetermined by the intended capacity of the pump. The chords of this second pair of arcs being disposed at 90° to the chords of the first pair. Both pairs of arcs 5A, 5A and 5B, 5B are concentric with the rotor. The remaining portions 5C, which join adjacent arcs, are formed so that each sliding vane 6 in passing from a circular arc of one radius to an adjacent circular arc of the other radius must move in its radial slot first at a constant rate of acceleration till it is mid-way between the arcs and then at a constant rate of deceleration till it reaches the said adjacent circular arc. It should be noted that the angular length of each portion 5C is double the angular distance between two adjacent abutments since an even number of abutments is employed. In the present example having sixteen vanes the length of the said curve is 45° and the angular distance between adjacent vanes is of course 22.5°.

An inlet connection 2A in the end-housing 2 (Fig. 1) communicates with an inlet chamber 2B in the form of an annulus enclosed by the facing 7. The facing 7 has two inlet ports 7A (Fig. 2) diametrically opposed to one another and coinciding approximately with those portions of the stator bore 5C that join minor arcs to adjacent major arcs in the direction of rotation. These inlet ports 7A connect the inlet chamber 2B to the expanding chambers between the rotor 4 and the bore of the stator 5 and via the channels 6A, with the bottoms of the radial slots for the vanes 6.

The end-housing 3 has a blind hole 3A drilled diametrically through the centre and screw-threaded at its open end to provide an outlet connection. The hole 3A communicates by means of holes 3B extending parallel with the axis, to ports 8A in the facing member 8. The ports 8A coincide with those portions of the stator bore 5C that join major arcs to adjacent minor arcs in the direction of rotation, and thus connect the contracting chambers to the pump outlet line.

The operation of the described pump will be evident to those skilled in the art and need not be described in detail. It is sufficient to point out that what may be termed vane actuated displacement takes place as the vanes 6 sweep the arcuate chambers contained between those portions of the bore of the stator 5 formed by the arcs 5B of major radius and the periphery of the rotor 4; piston actuated displacement takes place from the bottoms of the vane slots in the rotor 4 as the vanes 6 move radially inwards when travelling along a joining curve 5C from an arc 5B of major radius to an adjacent arc of minor radius 5A of the stator bore; inlet flow to both vane and piston actuated chambers takes place as the vanes 6 travel along a joining curve 5C from an arc 5A of minor radius to an adjacent arc 5B of major radius of the stator bore; the piston actuated chamber at the bottom of each vane is connected freely to the vane actuated chamber in the front of the same vane via the channel 6A.

In the arrangement shown in cross section by Fig. 5, the rotor 4 has an enclosed annular chamber 4A formed within it. This chamber is connected by radial holes to the bottoms of the slots guiding the vanes 6 and in these holes are free to slide plungers 17 which are in contact at their outer ends with the vanes 6. The bore of the stator 5 is profiled as previously described (see Fig. 4). If the chamber 4A is charged with a suitable medium continuous contact will be maintained between all the vanes 6 and the stator bore.

In the arrangement shown in cross section by Fig. 6 the diameter of the rotor 4 is substantially less than the minor diameter of the bore of the stator 5. To provide a continuous seal between the outlet and inlet chambers it is essential that the vanes 6 maintain contact with those portions of the stator bore formed by the arcs of minor radius. To ensure continuity of contact over these portions the vanes have lips 6B (see also Fig. 7) formed at their outer ends and at the rear edges relative to the direction of rotation. When a vane is passing over an arc of minor radius hydraulic pressure develops an outward re-action on the vane by reason of the lip to keep it in contact with the stator.

Referring now to Figs. 8, 9 and 10, here the shaft 1 is journalled in the end-housing 2, and keyed to the inner end of the shaft so as to be free to slide axially on it is a sliding member 18 to which are rigidly secured the rotor 4 and an abutment retaining member 7A. These two parts 4 and 7A are clamped on the sliding member 18 by a nut 19. The rotor 4 has sixteen equally spaced radial slots at its outer circular periphery. Laminated vanes $6^x$ are free to slide in these slots and to co-act at their outer ends with the bore of the surrounding stator 5 which is profiled as previously described (see Fig. 4). The vane laminae are profiled so that all the vanes make contact with the stator bore only at their rear edges in relation to the direction of rotation. The stator 5 is rigidly secured to the end-housing 2 and is centrally disposed in relation to the shaft 1 and rotor 4. The end-housing 2 has a recess 2D adjacent to the stator which has a diameter equal to the outside diameter of the rotor 4 and the retaining member 7A except for running clearance. Mounted on a step 18A on the sliding member 18, on the reverse side of the rotor from 7A, is a keeper ring 10. This keeper ring 10 is free rotationally but is fixed axially in relation to the sliding member 18 and acts as the second retainer of the laminated vanes $6^x$. It is profiled on the outside identically to the bore of the stator, inside which it is a sliding fit. The rear end of the sliding member 18 is bored to house a ball bearing 18B which is fixed axially by a clamping plate 11. Rigidly secured in the bore of the inner race of the ball bearing 18B is a control nut 14 which co-acts with a control screw 12. The control screw takes a rotational bearing in the inlet end-housing 3 in which it is located axially by the hub 13A of a control wheel 13 and by a shoulder 12A of the screw 12. The inlet end-housing 3 is centrally disposed in relation to the stator 5 and both it and the end-housing 2 are secured rigidly to the stator by bolts 16 (Figs. 9 and 10).

By rotating the control wheel 13, which is secured to the control screw 12, the sliding member 18 (Fig. 8) and with it the rotor 4, the retaining member 7A, and the keeper ring 10, can be moved axially at will in either direction while the rotor is rotating. The effective width of the pumping chambers is limited by the keeper ring 10 on one side and the inner face of the end-housing 2 on the other; thus this width can be varied at will by rotating the control wheel 13. When the rotor 4 is moved axially so that all or part of it is inside the bore or recess 2D of the end-housing 2, those abutment laminae that are inside the recess are rendered ineffective from the point of view of pumping; thus the effective width of the vanes $6^x$ always corresponds to the effective width of the pumping chambers. Movement of the rotor to the left (Fig. 8) into the recess 2D of the end housing 2 is possible when the rotor is rotating because of the working clearance between the vane laminae. When the rotor is being moved into the recess 2D the vanes that do not coincide circumferentially with the recess become flexibly compressed as compared with the vanes that do coincide circumferentially with the recess at any particular moment. Thus, as the rotor rotates, laminae from succeeding vanes pass inside the recess, and the rotor can be continually moved to the left until the vanes are completely inside the recess 2D to the required extent.

A series of holes 2E which coincide with the contracting pumping chambers are drilled from the inside face of the end-housing 2 to connect with an annular groove 2F formed around the perimeter of the end-housing 2. A member 15 surrounding the end-housing 2 has a screwed connection 15A communicating with the groove 2F to form the outlet from the pump. The keeper ring 10 has two axial grooves 10A (see Fig. 10) formed on its outside periphery coinciding with the expanding pumping chambers. These grooves 10A connect to the bore 30 of the inlet end-housing 3, which member has also a radial screwed connection 3D to the bore 3C which forms the inlet connection of the pump.

Figs. 11, 12 and 13 show a fixed delivery pump similar to that described with reference to Figs. 1 to 4 except that it has been arranged for piston displacement only. The channels 6A in the vanes (Figs. 1 to 4) have been omitted, and inlet and outlet ports 7C and 8C connect with the pumping chambers at the inner ends of the vanes. Further ports 8B, which coincide with those portions of the stator bore that join the arcs of major radius to those of minor radius in the direction of rotation, connect the contracting chambers at the outsides of the vanes to the delivery line. These provide practical equality of pressure on the insides and outsides of the vanes during the pressure pumping periods.

Fig. 14 is a flow diagram for the pump of Figs. 1 to 4 having sixteen vanes.

Pumps as herein described offer inter alia the following advantages:

A. Uniform flow, and hydraulic balance, which are not upset by the operation of the vanes as pistons, this operation being effective either to supplement or to create the delivery.

B. The forces due to hydraulic action, tending to press the vanes against the stator, are at all times reduced to a minimum, due to the fact that the hydraulic pressure and the areas of the vanes against which it operates are practically equal at each end of the vanes; for this reason high mechanical efficiency is obtained and excessive wear prevented even at very high pumping pressures.

C. The above conditions, together with the general construction provide the maximum resistance to internal leakage; a single stage pump according to our invention can thus be constructed giving very good volumetric and mechanical efficiencies at high pressures up to 4000 or 5000 lbs. per square inch; previously, single stage vane pumps have not been suitable for pressures above 1000 lbs. per square inch.

D. In the case of the variable delivery pump, the delivery can be varied without interfering with the uniformity of flow, the hydraulic balance, or the compression ratio.

I claim:

1. A rotary pump or motor comprising a rotor rotatable within a surrounding stator and an even number of vanes radially slidable in equidistant recesses formed in the rotor, the space between the rotor and the stator bore in front of each vane in the order of rotation of the rotor being freely connected to the space at the bottom of the pertaining recess, the end of each vane in contact with the stator affording one fixed line of contact with the stator proximate the rear edge of the vane in the order of rotation of the rotor which line does not vary in relation to the rest of the vane as the rotor rotates, the stator bore being formed of two equal diametrically disposed arcs of major radius, two equal arcs of minor radius whose chords are at 90° to those of the arcs of major radius, and four equal joining curves each joining adjacent major and minor arcs, characterised in that each joining curve has an angular length double the angular distance between adjacent vanes and formed with radii that respectively decrease and increase in length from the major and minor arcs according to the square of their angular distance therefrom to a mid point of radius which is the mean of the radii of the major and minor arcs.

2. A rotary pump or motor as set forth in claim 1, each vane comprising a plurality of laminae the contact faces of the laminae being parallel with the plane of rotation of the rotor, each of said laminae being radially slidable with respect to one another, retaining rings at both ends of the rotor and concentric to it one of which is rotatable with the rotor and of the same outside diameter while the other is free rotationally and has an external periphery which corresponds and is a sliding fit in the bore of the stator, a member fixed rigidly and concentrically with the stator whose circular bore is the same diameter as the rotor and in which the retaining ring fixed to the rotor rotates, and means for sliding the rotor and the retaining rings axially in relation to the stator so that the number of radially displaced laminae can be varied so varying the fluid displacement of the machine.

References Cited in the file of this patent

UNITED STATES PATENTS

| | | |
|---|---|---|
| 165,623 | Smethells | July 13, 1875 |
| 888,779 | Berrenberg | May 26, 1908 |
| 1,659,753 | Thompson | Feb. 21, 1928 |
| 1,776,452 | Rosenthal | Sept. 23, 1930 |
| 1,855,708 | Dilg | Apr. 26, 1932 |
| 1,989,900 | Vickers | Feb. 5, 1935 |
| 2,016,315 | Calzoni | Oct. 8, 1935 |
| 2,255,785 | Kendrick | Sept. 16, 1941 |
| 2,313,075 | Kendrick et al. | Mar. 9, 1943 |
| 2,335,284 | Kendrick | Nov. 30, 1943 |
| 2,368,223 | Kendrick | Jan. 30, 1945 |
| 2,377,556 | Jeannin | June 5, 1945 |
| 2,387,761 | Kendrick | Oct. 30, 1945 |
| 2,411,602 | Tweedale | Nov. 26, 1946 |
| 2,538,193 | Ferris | Jan. 16, 1951 |
| 2,545,238 | MacMillin et al. | Mar. 13, 1951 |
| 2,575,074 | Senninger | Nov. 13, 1951 |
| 2,588,430 | Svenson | Mar. 11, 1952 |